United States Patent
Irwin et al.

(10) Patent No.: US 12,384,430 B2
(45) Date of Patent: Aug. 12, 2025

(54) DURABLE RAILROAD BRAKE STICK HEAD

(71) Applicant: Precision Cut 3D LLC, Ogden, UT (US)

(72) Inventors: John Richard Irwin, Ogden, UT (US); Dan B. Follett, Morgan, UT (US)

(73) Assignee: Precision Cut 3D LLC, Ogden, UT (US)

( * ) Notice: Subject to any disclaimer, the term of this patent is extended or adjusted under 35 U.S.C. 154(b) by 313 days.

(21) Appl. No.: 17/875,091

(22) Filed: Jul. 27, 2022

(65) Prior Publication Data

US 2022/0355836 A1    Nov. 10, 2022

Related U.S. Application Data

(63) Continuation-in-part of application No. 17/183,124, filed on Feb. 23, 2021, now Pat. No. 11,597,416.

(60) Provisional application No. 62/981,504, filed on Feb. 25, 2020.

(51) Int. Cl.
*B61H 13/02* (2006.01)
*B25G 1/10* (2006.01)
*B60T 17/22* (2006.01)

(52) U.S. Cl.
CPC .............. *B61H 13/02* (2013.01); *B25G 1/10* (2013.01); *B60T 17/228* (2013.01)

(58) Field of Classification Search
CPC . B25G 1/00; B25G 1/04; B25G 1/043; B25G 1/10; B25G 3/00; B25G 3/02; B25G 3/04; B25G 3/06; B25G 3/08; B25G 3/24; B25G 3/36; B61H 13/00; B61H 13/02; B60T 17/22; B60T 17/221; B60T 17/228

See application file for complete search history.

(56) References Cited

U.S. PATENT DOCUMENTS

| | | | | | |
|---|---|---|---|---|---|
| 2,656,751 | A | * | 10/1953 | Johnson | B25B 13/5058 81/186 |
| 2,683,346 | A | * | 7/1954 | Pieper | D01H 7/604 57/125 |
| 3,292,359 | A | * | 12/1966 | Morin | D01H 7/604 57/125 |

(Continued)

OTHER PUBLICATIONS

United States Patent and Trademark Office; International Search Report and Written Opinion dated Jul. 26, 2023 issued in PCT Application No. PCT/US23/28696; 10 pages.

*Primary Examiner* — Robert J Scruggs
(74) *Attorney, Agent, or Firm* — MASCHOFF BRENNAN

(57) ABSTRACT

A railroad brake stick head has a head body formed of a lightweight durable material. A railroad brake stick head includes a head body having two opposing planar surfaces spaced apart by at least one sidewall that includes at least one concave sidewall region, wherein the head body is formed of a first material having a first hardness. At least one brace implant is at least partially embedded in at least one concave sidewall region, wherein each brace implant is formed of a second material having a second hardness that is harder than the first hardness. The head body includes at least one implant recess formed into the at least one concave sidewall region, and the at least one brace implant is in the at least one implant recess. Each brace implant can be coupled with the head body, such as by friction fit, adhesive, fastener, or combination thereof.

21 Claims, 9 Drawing Sheets

(56) References Cited

U.S. PATENT DOCUMENTS

| | | | | |
|---|---|---|---|---|
| 3,364,671 | A * | 1/1968 | Morin | D01H 7/604 |
| | | | | 57/125 |
| 5,141,353 | A | 8/1992 | Meredith et al. | |
| 5,481,950 | A | 1/1996 | Browning | |
| 6,126,359 | A * | 10/2000 | Dittrich | B25G 3/04 |
| | | | | 403/325 |
| 7,069,815 | B1 * | 7/2006 | Yu | B67B 7/14 |
| | | | | 81/3.4 |
| D663,193 | S | 7/2012 | Lofley, Sr. et al. | |
| D676,735 | S | 2/2013 | Lofley, Sr. et al. | |
| 8,434,802 | B2 | 5/2013 | Lofley, Sr. et al. | |
| 8,469,425 | B1 | 6/2013 | Lofley, Sr. et al. | |
| 8,469,426 | B2 | 6/2013 | Lofley, Sr. et al. | |
| 8,939,051 | B1 * | 1/2015 | Lofley, Sr. | F16B 7/1472 |
| | | | | 81/177.2 |
| D760,564 | S | 7/2016 | Lofley, Sr. et al. | |
| D786,638 | S | 5/2017 | Lofley, Sr. et al. | |
| D843,183 | S | 3/2019 | Lofley, Sr. et al. | |
| D871,174 | S | 12/2019 | Lofley, Sr. et al. | |
| 10,759,453 | B1 | 9/2020 | Ayala et al. | |
| 11,311,998 | B1 | 4/2022 | Lofley, Jr. et al. | |
| 11,597,416 | B2 * | 3/2023 | Irwin | B25G 1/10 |
| 2012/0146354 | A1 | 6/2012 | Lofley, Sr. et al. | |
| 2018/0085911 | A1 * | 3/2018 | Browning | B25G 1/04 |
| 2021/0261174 | A1 * | 8/2021 | Irwin | B61H 13/02 |
| 2021/0347028 | A1 * | 11/2021 | Zanoni | B25F 1/02 |
| 2022/0355836 | A1 | 11/2022 | Irwin et al. | |
| 2022/0386832 | A1 * | 12/2022 | Hall | B25G 1/04 |

\* cited by examiner

DURABLE RAILROAD BRAKE STICK HEAD

CROSS-REFERENCE TO RELATED APPLICATIONS

This patent application is a continuation-in-part of U.S. application Ser. No. 17/183,124 filed Feb. 23, 2021, which claims priority to U.S. Provisional Application No. 62/981,504 filed Feb. 25, 2020, which applications are incorporated herein by specific reference in their entirety.

BACKGROUND

Field

The present disclosure relates to railroad brake sticks.

Description of Related Art

Previously, railroad brake sticks have been made of heavy metal materials. The construction of the prior railroad brake sticks was designed for a heavy metal object to interact with train components. As a result, prior railroad brake sticks were prepared from heavy metal materials with robust construction. However, the heavy railroad brake sticks are difficult to use due to the significant weight.

Attempts to improve railroad brake sticks have included designs of adjustable length sticks, such as the following: U.S. Pat. Nos. 8,434,802; 8,469,425; 8,469,426; 8,939,051; 10,759,453; D663,193, D676,735; D786,638; D760,564; D871,174; and D843,183, which are incorporated herein by specific reference in their entirety. However, the improved railroad brake sticks are now more complex and more difficult to manufacture and operate.

Thus, there is a need for a railroad brake stick that is lightweight and can be more easily and safely used for railroad operations, and which is strong and durable to be useful in the railroad environment for a long period of time.

SUMMARY

In some embodiments, a railroad brake stick head can include: a planar head body having two opposing planar surfaces spaced apart by at least one sidewall that includes at least one concave sidewall region, wherein the head body is formed of a first material having a first hardness; and at least one brace implant at least partially embedded or located in at least one concave sidewall region, wherein each brace implant is formed of a second material having a second hardness that is harder than the first hardness. In some aspects, at least a portion of each brace implant protrudes from the respective concave sidewall region, which dimension of protrusion from the surface of the concave sidewall region to the corresponding surface of the brace implant (e.g., parallel working surface, such as proximal or distal) In some aspects, the head body includes at least one implant recess formed into the at least one concave sidewall region, and the at least one brace implant is in the at least one implant recess. In some aspects, each brace implant is coupled with the head body. In some aspects, the coupling of each brace implant with the head body is by friction fit, adhesive, fastener, or combination thereof. In some aspects, the fastener includes at least one rivet or other member (e.g., roll pin) that rivets or otherwise couples to the brace implant through the planar surfaces of the head body.

In some embodiments, the head body is formed of a plastic material or a composite material. In some aspects, the plastic material is selected from high density polyethylene, ultra-high molecular weight polyethylene (UHMW-PE; 3.5-7.5 million Da), high density polyurethane, polyoxymethylene (Acetal), polyimide (Vespel), high impact polystyrene, polyamide (nylon), polyamide-imide (PAI), polybutylene terephthalate (PTB), polyetheretheketone (PEEK), polyethylene terephthalate (PET), or combinations thereof. The head body material may also include filler, such as ceramic particles, Kevlar fibers or other particles/fibers, which can increase the abrasion resistance. The polymer can be impregnated with the filler to achieve tough inert very abrasive resistant (TIVAR) plastics, such as TIVAR UHMW plastics (e.g., TIVAR UHMW-PE). TIVAR is available in unfilled and filled grades for enhanced wear resistance, UV resistance, ESD, lower COF, higher operating temp, flame retardant and other enhanced properties.

In some embodiments, the brace implant is formed of a metal material. In some aspects, the metal material is selected from brass, stainless steel, carbon and manganese steels, bronze, manganese bronze (e.g., manganese bronze 865), or combinations thereof. In some aspects, the brace implant is a non-sparking material. In some aspects, the non-sparking material is cubic boron nitride, carbon nitride, carbide, cermet, brass, bronze, manganese bronze (e.g., manganese bronze 865), copper-nickel alloy, copper-aluminum bronze alloy, copper-beryllium bronze alloys, or combinations thereof.

In some embodiments, the head body includes a head portion and a hilt portion, wherein the hilt portion includes a slot extending between the two opposing planar surfaces from a hilt end toward the head portion. In some aspects, the hilt portion includes at least one notch formed into at least one hilt sidewall, wherein each notch extends between the two opposing planar surfaces. In some aspects, the slot includes at least one notch formed into at least one slot sidewall, wherein each notch extends between the two opposing planar surfaces.

In some embodiments, a railroad brake stick can include the railroad brake stick head of one of the embodiments and a handle coupled with the railroad brake stick head. In some aspects, the railroad brake stick can include: the head body having a planar shape with a head interlocking groove on a hilt region; a cross-support having a planar shape with a support interlocking groove interlocked with the head interlocking groove such that the planar shape of the head crosses with the planar shape of the cross-support to form an interlocking region; and the handle is coupled to the head and cross-support such that the interlocking region is within an end of the handle.

In some embodiments, the railroad brake stick can include at least one of a phosphorescent member or reflective member attached to the handle.

In some embodiments, a method of making the railroad brake stick head can include: forming a head body having two opposing planar surfaces spaced apart by at least one sidewall that includes at least one concave sidewall region, wherein the head body is formed of a first material having a first hardness; forming at least one brace implant; and embedding the at least one brace implant in at least one concave sidewall region, wherein each brace implant is formed of a second material having a second hardness that is harder than the first hardness. The embedding can result with at least a portion of the brace implant being exposed and protruding from the surface of the respective concave sidewall.

In some embodiments, a method of making a railroad brake stick can include performing the method to obtain the railroad brake stick head; and coupling the railroad brake stick head with a handle.

In some embodiments, a method of operating a railroad brake stick can include providing the railroad brake stick of one of the embodiments, and operating a railroad element with the head of the railroad brake stick such that at least one brace implant contacts the railroad element.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1A:
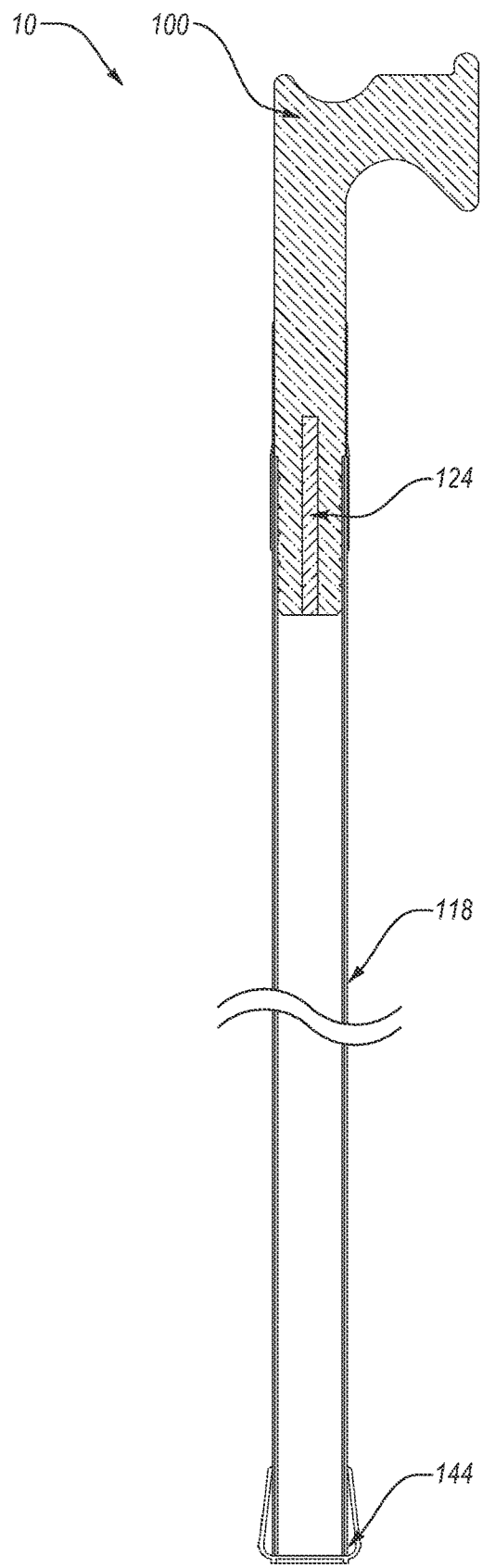
FIGS. 1A-1B show orthogonal cross-sectional views of a railroad brake stick having a head coupled to a cross-support member for stability and inserted into a handle.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In some embodiments, a lightweight and durable railroad brake stick is provided that can be used in a railroad setting. Previously, railroad brake sticks have been fairly well known, and prior brake sticks are quite heavy to lift at about 8 to 14 pounds. So, when trying to handle that type of weight in a stick form in the railroad environment, it is quite heavy for the user. As a result, the working end of an old railroad brake stick feels like it's unbalanced and it's difficult to use for the human user.

Now, the present railroad brake stick is a lightweight material (e.g., plastic, composite, or other material) device that is durable enough that it can be used in the same way as prior railroad brake sticks. The lightweight railroad brake stick is configured with similar dimensions and working head shape, so that it does the same thing as prior brake sticks. For example, the lightweight brake stick can be configured to have a very similar shaped working head as any other brake stick. However, the structure of the new railroad brake stick is significantly different due to the nature of using the lightweight durable materials. The brake stick has the head at a distal end and a handle at a proximal end when holding the handle by a user. The brake stick has a proximal side which is close to the user and a distal side that's away from the user. The head has the proximal sides cut out to form a concave shape for a pull working surface and it has a distal protrusion that is aligned with the handle that can be used for a push working point. The head is attached to the handle and has a distal scoop (e.g., concave region, push working surface) and it also has the distal protrusion at the exterior of the head for a push working point. The head has some shapes that have some functionalities, such as pull or push work surfaces, but it looks like a traditional brake stick. The figures illustrate the new railroad brake stick.

Figure 1B:
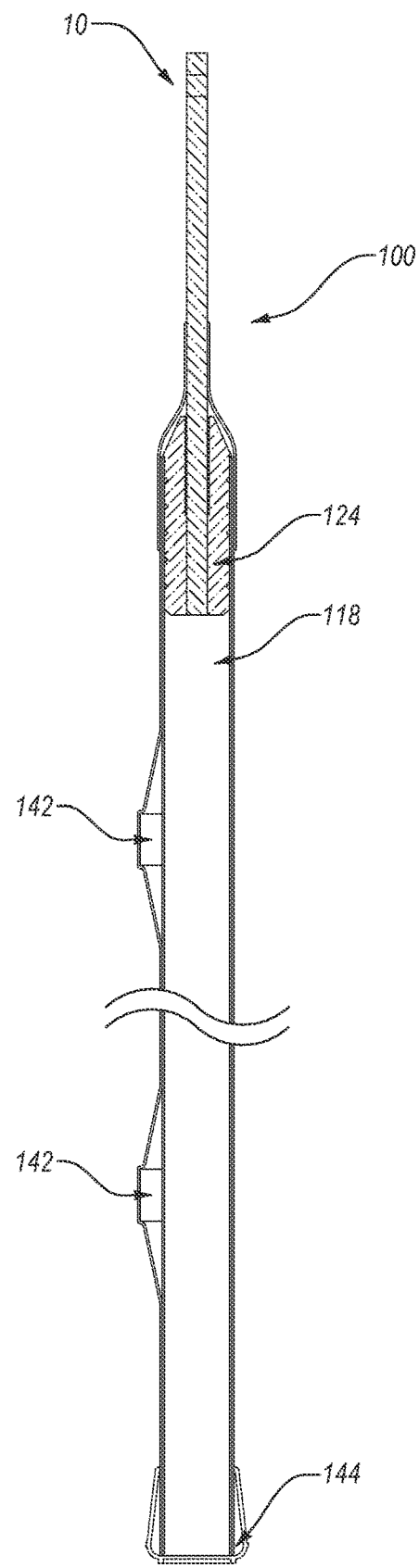

FIGS. 1A-1B show orthogonal cross-sectional views of a railroad brake stick 10 having a head 100 coupled to a cross-support member 124 for stability and inserted into a handle 118. At least two magnets 142 are included on the handle 118. An end cap 144 is included on the handle 118 opposite of the head 100. As shown, the head 100 and cross-support 124 are located within a lumen in the handle 118 at the distal end thereof.

Figure 2A:
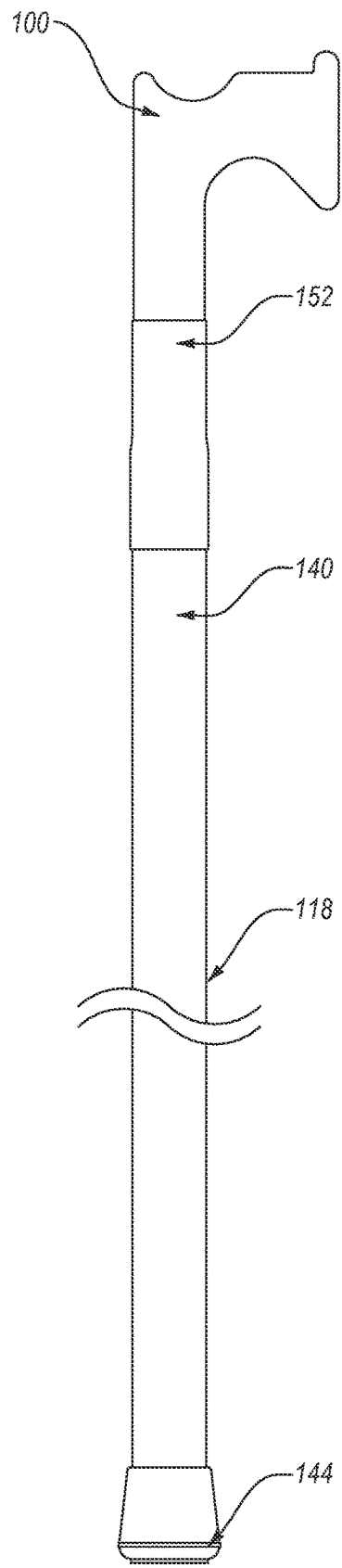
FIGS. 2A-2B show orthogonal side views of the railroad brake stick.
Figure 2B:
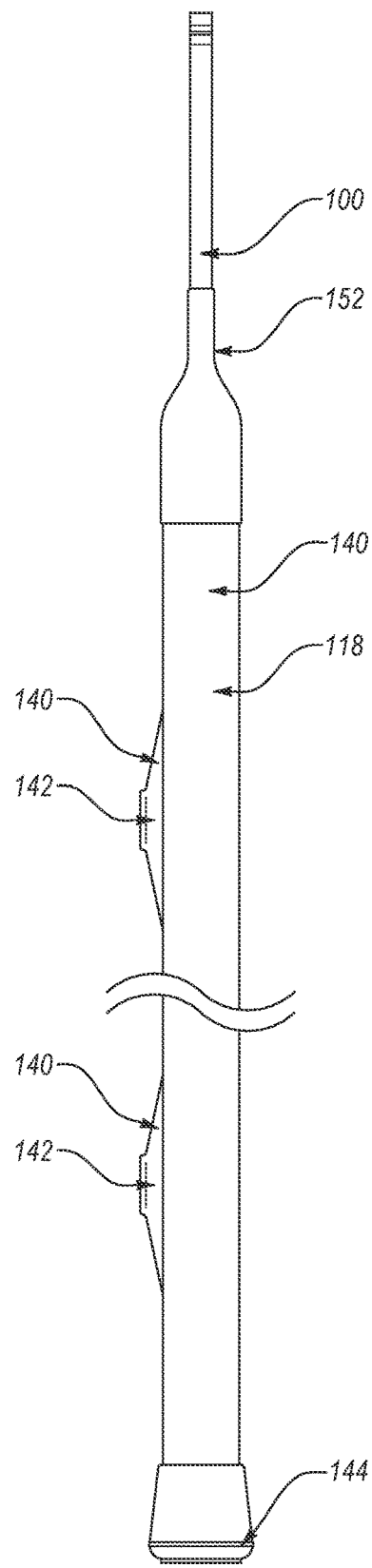

FIGS. 2A-2B show orthogonal side views of the railroad brake stick 10. A handle sleeve 140 is located over the handle and a proximal portion of the head 100. A neck cover 152 is positioned over a distal portion of the handle sleeve 140 and over a proximal portion of the head 100. Here, handle sleeve 140 is shown overlapping the handle 118 and overlapping a part of the head 100. The part of the head 100 that is covered with the handle sleeve 140 can be considered to be the hilt. The neck cover 152 is also shown overlapping on the hilt and head 100.

The figures show a railroad brake stick head 100 having a planar shape with recesses (e.g., 112, 108) and/or protrusions (e.g., 114, 106) on one or more side surfaces of the planar shape, the planar shape having a head interlocking groove (e.g., slot 120) on a hilt region. The cross-support 124 has a planar shape with a support interlocking groove (e.g., slot 126) that can be interlocked with the head interlocking groove such that the planar shape of the head 100 is crossed with the planar shape of the cross-support 124 to form an interlocking region. A handle 118 is coupled to the head 100 and cross-support 124 such that the interlocking region is within an end of the handle 118. A handle sleeve 140 is over the handle 118 and optionally over a portion of the head 100. The neck cover 152 is over the distal part of the handle sleeve 140 and a proximal part of the hilt of the handle 118.

Figures 3A, 3B:
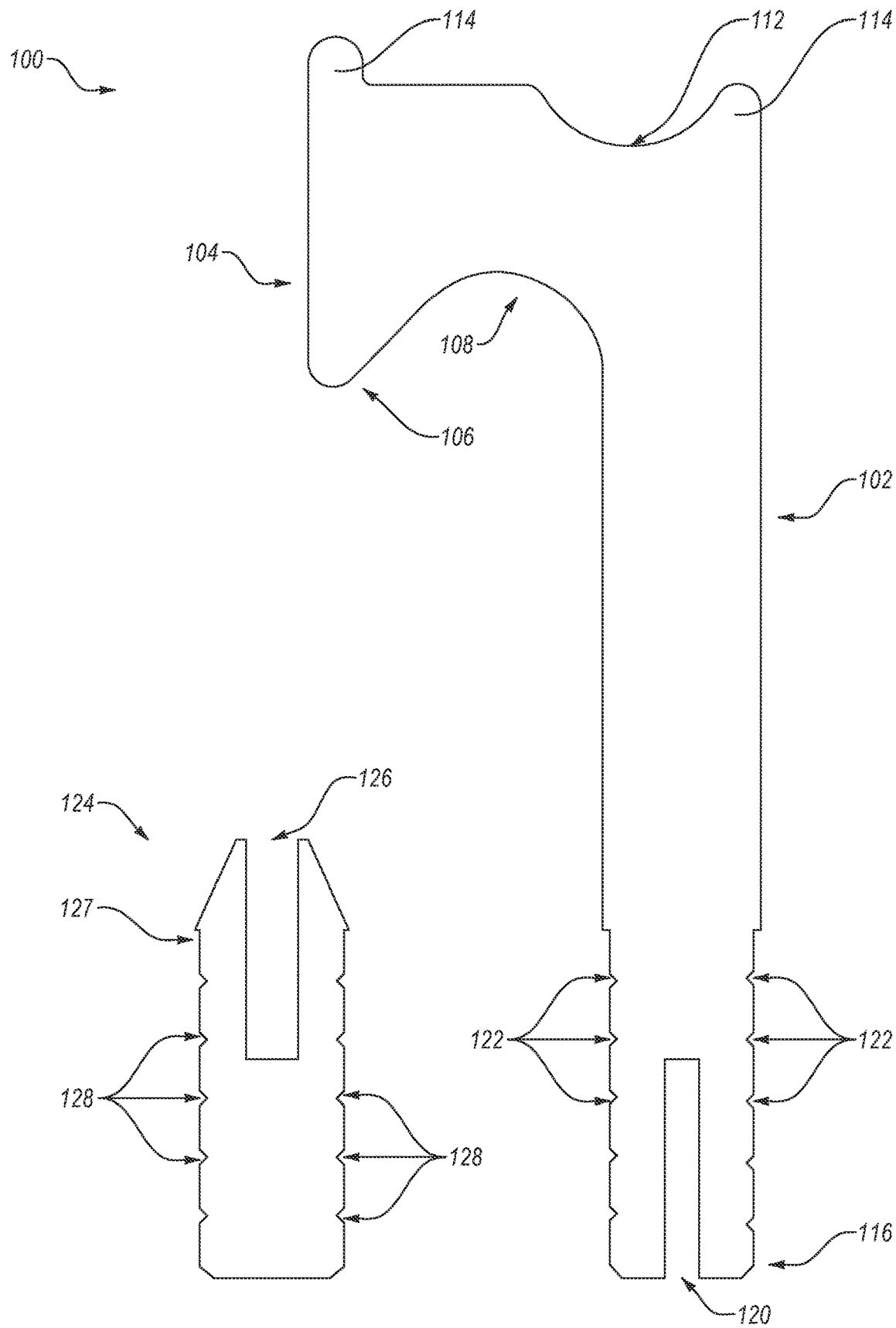
FIGS. 3A-3B show a side view the head and cross-support of the railroad brake stick.

FIGS. 3A-3B show the head 100 and cross-support 124 of the railroad brake stick. The head 100 can have a hilt 102 and tool region 104 such that the tool region 104 extends laterally from the hilt 102. The tool region 104 includes a side edge with shapes formed therein to give the planar profile side view shape (FIG. 3B). The hilt 102 includes a coupling region 116 (e.g., interlocking region) opposite from the tool region 104, where the coupling region 116 is configured to be coupled with a handle 118. The coupling region 116 includes a slot 120 extending from an end of the hilt 102 toward the tool region 104 and includes at least one notch 122 on a side.

The cross-support 124 includes a slot 126 extending from an end of the cross-support 124 into the body to form a slot shape. The cross-support 124 includes at least one notch 128 on a side. The slot 120 of the head 100 is configured to receive a portion of the cross-support 124 therein and the slot 126 of the cross-support 124 receives a portion of the head 100 therein such that the head 100 and cross-support are interlocked in a tongue and groove manner to form an interlocking region corresponding to the coupling region 116 when interlocked.

The figures show that the head 100 has a hilt 102 and tool region 104 integrated together such that the tool region 104 extends laterally from the hilt 102. The tool region 104 includes a proximal side 106 having a concave region 108 and a distal side 110 having at least one concave region 112 or at least one protrusion 114, which can be used as work surfaces or work regions. The hilt 102 includes a coupling region 116 opposite from the tool region 104, wherein the coupling region 116 is configured to be coupled with a handle 118. The coupling region 116 includes a slot 120 extending from an end of the hilt 102 toward the tool region 104 and includes at least one notch 122 lateral of the slot 120.

A cross-support 124 including a slot 126 extending from an end of the cross-support 124 and including at least one notch 128 lateral of the slot 126. The slot 120 of the head 100 receives a portion of the cross-support 124 therein and the slot 126 of the cross-support 124 receives a portion of the head 100 therein such that the head 100 and cross-support are interlocked in a tongue and groove manner to form an interlocking region.

Figure 4A:
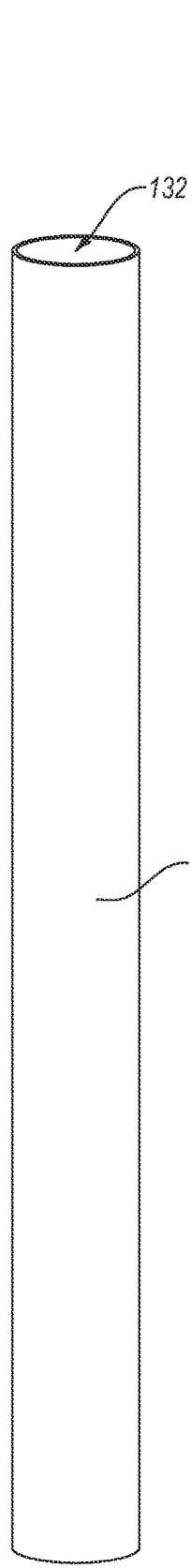
FIG. 4A shows a side view of a handle.

FIG. 4A shows the handle 118 to be coupled to the head 100, wherein the handle 118 includes a conduit 132 dimensioned to receive the interlocking region of the interlocked head 100 and cross-support 124 therein so as to provide chambers 134 (e.g., FIG. 4C) between the interlocking region an internal surface of the conduit 132. The binder 136 FIG. 5B) is located in the chambers 134 and in the notches 122 and notches 128 such that the binder 136 extends between the chambers 134 through the notches 122 and notches 128.

Figure 4B:
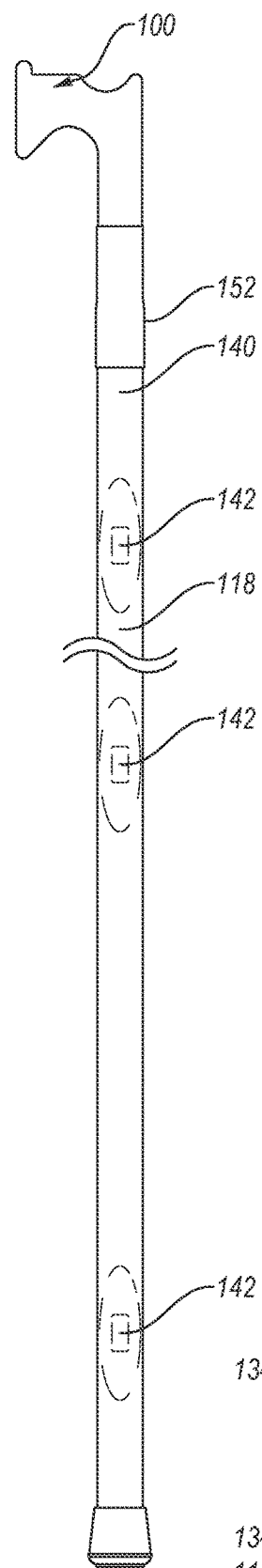
FIG. 4B shows a side view of the head and cross-support interlocked piece inserted into the handle to form the railroad brake stick.
Figure 4C:
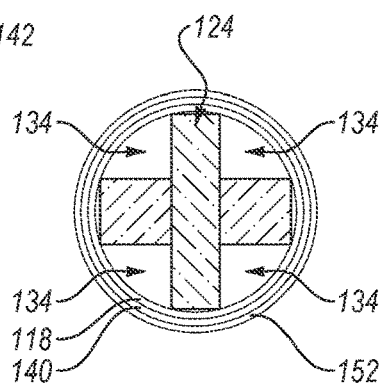
FIG. 4C shows a cross-sectional view of the head and cross-support interlocked piece inserted into the handle.

FIG. 4B shows the handle 118 coupled to the head 100, wherein the handle 118 receives the interlocking region of the interlocked head 100 and cross-support 124 covered by the neck cover 152. A binder 136 is located in the handle 118 around head 102 and cross-support 124 as shown in FIGS. 5B and 5C.

Figure 5A:
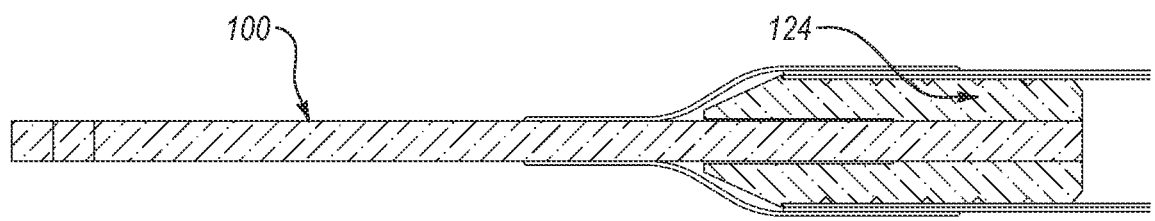
FIG. 5A shows front top cross-sectional view of the head and cross-support interlocked piece.
Figure 5B:
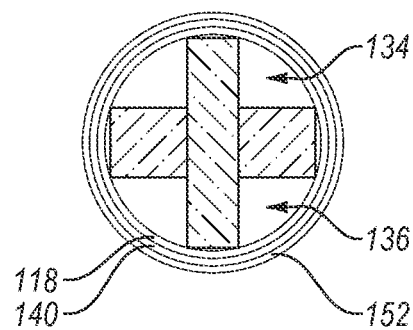
FIG. 5B shows the lateral cross-sectional view of the head and cross-support interlocked piece.
Figure 5C:
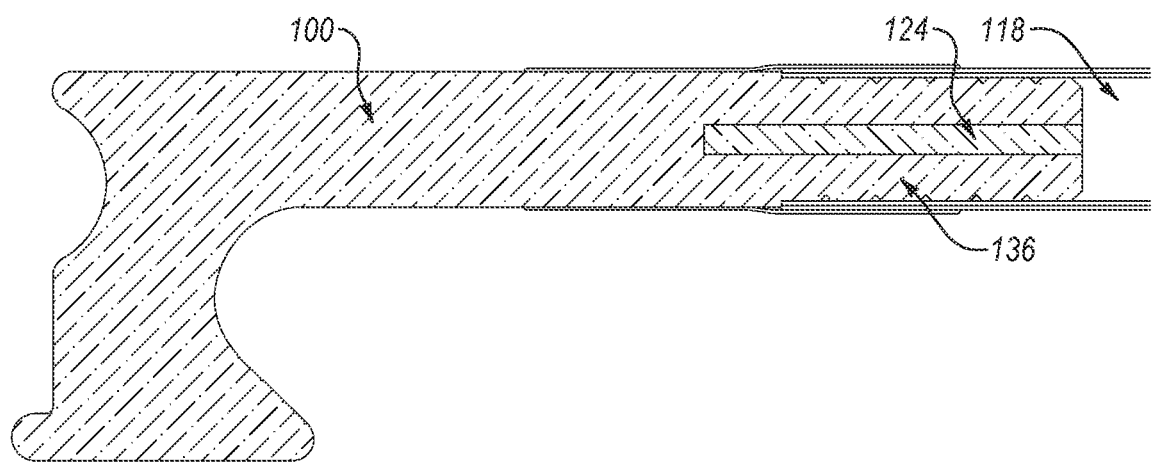
FIG. 5C shows the side cross-sectional view of the head and cross-support interlocked piece.

FIG. 5A shows the longitudinal cross-sectional view of the head 100 interlocked with the cross-support 124. FIG. 5B shows the lateral cross-sectional view of the head interlocked with the cross-support 124 to form the chambers 134 that are then inserted into the handle 118 in the form of a tube and then the binder 136 is inserted into the chambers 134. FIG. 5C shows the longitudinal cross-sectional view once the head 100 and interlocked cross-support 124 are locked into the handle 118 with the binder 136. Alternative, the hollow handle 118 receives the binder, and then the head 100 is inserted into the binder already in the handle 118. The binder then pushes further into the tubular handle 118, which plugs the handle 118, fills gaps in the handle 118, and pushes some binder out of the opening of the handle 118, which can be cleaned. While the steps can be performed in any order, the result in the handle 118 having the binder with the head 100 forming an assembly that locks the head 100 to the handle 118.

The railroad brake stick can have various configurations, such as those shown and described herein and the incorporated applications. In some embodiments, the head includes a top planar surface, bottom planar surface, and at least one short side surface extending between the planar surfaces. In some aspects, the side surface includes shapes formed therein to provide the head shape profile. In some aspects, the top surface and/or bottom surface can be flat or planar. In some aspects, the head is formed of a durable plastic, such as high density polyethylene, ultra-high molecular weight polyethylene, high density polyurethane, high density fluorinated plastics, polyamides (e.g., nylon, HyDLAR Z, nylon 6/6 with Kevlar fibers filled plastics with enhanced abrasion resistance, etc.) or composite material. In some aspects, the head is formed from a plurality of layers of para-aramid synthetic fiber sheets (e.g., Kevlar®) laminated or bonded together. In some embodiments, the sides of the head include layers of Kevlar® that are exposed. However, the head may be a different material, such as other composites, high density plastics, etc. For example, the head can be a graphene composite material. In some aspects, the material of the head can be a plastic or composite described herein, which can include a filler, such as ceramic or composite fillers. An example includes Kevlar fibers or ceramic particles being distributed through the body of the plastic.

In some embodiments, the cross-support is a plastic or composite material, which can be the same or different from the head. In some aspects, the cross-support includes a stop cut 127 (FIG. 3A), which abuts the end of the handle. The cross-support can be a layered carbon fiber material, layered para-aramid synthetic fiber, laminate material, composite material, or a polymer material. Alternatively, the cross-support is the durable plastic. In some examples, the cross-support can be any rigid material, such as a plastic, where acrylonitrile butadiene styrene (ABS) and polyurethane are examples. In some embodiments, the head is a abrasion resistant polymer (e.g., ultra-high molecular weight polyethylene) and cross-support is ABS.

In some embodiments, the handle includes carbon fiber. In some aspects, the handle is a tube of carbon fiber. However, other lightweight and durable materials can be used for the handle. The handle can be formed from a high density plastic, which can be different or the same as the head. Also, the handle may be formed from fiberglass, fiberglass with carbon fiber composite (e.g., fiberglass and carbon fiber layering), high density polyethylene, or other materials with high resistance to impact.

In some embodiments, a handle sleeve is a cover that is on the handle. In some aspects, the handle sleeve also covers a proximal portion of the head. In some aspects, the handle sleeve includes carbon fiber. In some aspects, the handle sleeve includes carbon fiber woven with a colored material, the colored material being a color other than black. In some aspects, the handle sleeve is a woven carbon fiber, woven fiberglass, Kevlar® (aramid), or combinations thereof. Alternatively, the sleeve can be other shrink tubing that can be shrink-fit onto the handle. Alternative materials include polyolefins, polyvinyl chloride, hydrofluorocarbons, elastomers, or others.

In some aspects, a neck cover over a portion of the handle sleeve adjacent to the head and continuing over a portion of the head. The neck cover can be a shrink tube shrunken onto the handle and proximal portion of the head. The neck cover can be polyurethane, which is configured as a heat shrink plastic. However, rubber, elastomer, or other protective materials could be used to protect the junction of the handle and head.

In some embodiment, the brake stick includes at least one magnet on the handle. In some aspects, the at least one magnet is between the handle tube and handle sleeve covering. In some aspects, the handle includes at least two magnets, where the at least two magnets are spaced apart from each other. In some aspects, the handle includes at least three magnets spaced apart from each other, where two of them can be closer to each other (e.g., near head) and one near the proximal end (e.g., opposite of the head).

In some embodiments, the brake stick is less than 3.5 lbs (and some weigh greater than 1.5 lbs). This can be achieved with composite materials (e.g., Kevlar® layers). Kevlar® is a heat-resistant para-aramid synthetic fiber with a molecular structure of many inter-chain bonds that make Kevlar® incredibly strong. Best known for its use in ballistic body armor, Kevlar® also has many other applications because of its high tensile strength-to-weight ratio. The chemical structure of Kevlar® is comprised of several repeating inter-chain bonds. These chains are cross-linked with hydrogen bonds, providing a tensile strength 10× greater than steel on an equal weight basis. In some aspect, the brake stick is less than 3.5 lbs when about 5 foot long. This translates to about 3.5 lbs per 5 ft. In some aspects, the brake stick is devoid of a metallic material on the head and/or handle. In some aspects, the Kevlar® is substituted with a different composite layering material. In some aspects, the head is a bulk composite material (not layered). While the length of the brake stick can determine the weight, the sizing or length can be configured to provide a brake stick that is less than or about 3.25 lbs, less than or about 3 lbs, less than or about 2.5 lbs, less than or about 2 lbs, less than or about 2.2 lbs, less than or about 2.5 lbs, less than or about 2.75 lbs, and less than or about 3 lbs (and greater than 1.5 lbs).

In some examples, the length of the brake stick can determine the weight as follows: 75" long tool weighing in an average of 2.5 lbs; 67" long tool weighing in an average of 2.3 lbs; 48" long tool weighing in an average of 2.0 lbs; or 37" long tool weighing in an average of 1.8 lbs.

In some embodiments, the handle has a crush strength of at least 2000 lbf, such as 2,136 lbf to 2,528 lbf to 2,674 lbf. The head has a tensile strength of at least 2000 lbf, such as 2,815 lbf to 3,120 lbf. The rubber handle end cap can be pulled off at about 1000 lbf to 1,230 lbf.

In some embodiments, the head has as shape as shown in one of the figures or incorporated references or provisional application.

In some embodiments, a method of manufacturing the railroad brake stick of one of the embodiments is provided. The manufacturing method can include: providing the head; providing the cross-support; interlocking the head and cross-support via the slots thereof in a tongue and groove interlocking; providing the handle; inserting a binder into a distal portion of the handle; inserting the interlocked head and cross-support into the distal portion of the handle or into binder in the distal portion of the handle; and curing the binder to fix the head in the handle. The head and cross-support can be inserted into the handle before the binder is applied or after the binder is applied. Also, the cross-support can be inserted into the handle before being coupled with the head.

The brake stick has a composite handle that also attributes to the lightweight. The head has the shaping for manipulation of the railroad environment.

In some embodiments, the head is made out of layers of Kevlar® (e.g., layered para-aramid synthetic fiber) that are stacked together and then cut to have the desired shape. In the process of preparing the head of the brake stick, the different layers of Kevlar® are manipulated as known for pressing Kevlar® layers together, which can be about 30 to 40 layers; however, this can vary depending on the desired thickness of the head. The number of Kevlar® layers could range or vary to change the thickness of the head, but in any event, no matter what the thickness is, it needs to be within certain dimension parameters. The thickness of the head can be between the 1 inch to 2 inch range, but that could vary. Other layered composites may also be used. For example, a graphene composite material can be layered and used for the head. Alternatively, durable high density plastics can be used for the head.

The head is cut out and then the proximal portion has a slot that is cut out of the head. A brace or cross-support member that is made of the same material or different material that has a corresponding slot is provided. The head and cross-support member have the corresponding slots so manufacturing can interlock them together in a somewhat tongue and groove fashion where they are slid into each other. The coupling causes the cross-section of the head to have a plus sign shape. So, the plus sign shape has each arm of the plus being a body of the head the cross-support. Those head and cross-support together create a hilt of the head.

The head includes the cross-sectional plus shape when combined with the cross-support. The edges of the exposed head and cross-support (e.g., not on the flat surface of the planar bodies) that are the cut edges of the head include recesses or notch shapes cut into it at the interlocking region. The recesses or notches allow for the further processing to attach the head to the handle with better adhesion. The notches provide improved grip between head and handle. The head and cross-support each includes the notch features etched into or cut into the sides (e.g., not the flat surface but the cut surface of the head) so the head that has the two pieces stuck together with a plus shape cross-section that has the notches on the four arms of the head and cross-support member.

The cross-support includes a tapered distal end that tapers from the handle to the rest of the head, the angle can be 40-60 degrees or other. This can be cut into the material that forms the cross-support. The shape is shown in the figures.

A long handle is provided, which can be a cylindrical handle in the form of a tube. On the distal end of the tube where the head is going to be received, there can be an opening to an internal lumen in the handle. The lumen can be within the tube and extend all the way from one end to the other end in order to provide the lightweight to the railroad stick. While the shapes are shown for the handle to be a circular cross-sectional tube, other shapes, such as polygons (e.g., square) could also be used.

The head that has the hilt with the cross-support to form the plus shape includes the interlocking region having cut outs or notches on the exposed edges of the cut edges. The interlocking region is slid into the handle end, and then epoxy, or another binding material is inserted into the handle and it cures around the cross sectional plus shape as well as through notches on the head and cross-support to create a more solid bond with the head and handle. However, the binder may be placed in the tube prior to the interlocking region of the head. In some aspects, the cut outs can match smaller grooves inside the tube, which may be aligned with the cut outs or random. The binder goes into the notches and binds the tube so it creates kind of a lock.

In some aspects, manufacturing includes sanding and roughening the inside of the handle tube so it adheres better to the epoxy and flox of the binder. The inside of the handle tube can be randomly sanded so the internal surface is grooved like a record album. The epoxy will be able to go between the notches and the sanded inside surface of the tube for better binding.

In some aspects, the epoxy includes a flox, which is a mixture of a flocked cotton that is mixed with the epoxy. The epoxy with flocked cotton "flox" makes a strong coupling because the fibers lock in together. The fibers help lock against the grooves sanded inside as well as the notches that are cut into the interlocking region of the head and cross-support. However, other binders or epoxies can be used. The epoxy may be used with or without filler. The filler may be cotton, fiberglass, or other filler.

During manufacturing, the plus shaped cross section of the hilt allows the product to have the epoxy in the four quadrants. The epoxy is provided to extend between quadrants through the notches to make a tighter lock with the handle. Also, the binder can penetrate into the sanded imperfections to make a tighter grip with the inside of the head. In an example, a caulking gun can be used to fill the chambers with the epoxy; however, other insertion methods can be used to provide the binder. In some aspects, the epoxy is only in the region in the lumen of the tube and hilt.

During the manufacturing process there can be a dowel or elongate member that can be inserted into the proximal end of the tube to provide a stop for not allowing the epoxy to move past it during the manufacturing procedure. In some aspects, a wad is used as a plug. The wad is placed in as deep as desired and the other end of the tube has a tube inserted temporarily to hold it in while pushing in the epoxy into the top distal opening of the tube. That is, the epoxy is placed into the tube above the wad or material stop so it is retained at the distal end, and then the head is inserted into the epoxy in the distal end of the tube. Alternatively, the head is inserted into the handle, and then the epoxy is added. The wad can be paper, cotton, or other material that functions as a stop for stopping flow of epoxy or flox. The wad can be retained in the device, or pulled out after the epoxy cures. The wad is any material stop inside the handle that prevents the epoxy from going all the way through the lumen and filling up the handle. For example, a small piece of paper is used so that the dowel will then pull back out and that piece of paper becomes part of the epoxy. A stopping material that stops the epoxy from moving any further is positioned somewhat relative to the proximal end of the hilt of that head. Alternatively, a material that epoxy doesn't stick to can be used as a temporary plug if desired. The dowel can be a material that does not stick to the epoxy.

In an example, the process can include putting the dowel in, putting the plug stop against the dowel, then filling (e.g., to some extent, not completely, but partially) the head end of the handle with the epoxy flox cotton mix. The head can then be pushed into the epoxy into it until it bottoms out. The epoxy is again applied until it oozes enough out then it is tapered off to the handle. Twisting can enhance filing of the notches with the epoxy.

In some aspects, the notches of the head and cross-support are filled with epoxy prior to insertion into the handle. In some aspects, the surfaces of the hilt are coated with epoxy prior to insertion into the handle. Alternatively, the hilt can be clean prior to insertion into the epoxy that is located in the distal end of the handle. The procedure can remove air pockets from the epoxy or from inside the handle around the hilt of the head.

In some embodiments, the pieces of the head assembly that is inserted into the tube handle are cut such that they will only go so far into the tube. There is a stop cut 127 (See. FIG. 3A) that hits the outside of the tube. That's how it is known when the head is fully inserted.

In some embodiments, the method can include applying binder to the notches of the head and/or cross-support. This can be performed at the same time the binder is applied into the handle. However, the interlocking region and notches can be preloaded with the binder.

In some embodiments, the method can include fitting a handle sleeve as a cover over the handle and optionally over a portion of the head. In some aspects, the method includes binding the handle sleeve to the handle. In some aspects, the binder is applied to the handle prior to applying the handle sleeve to the binder on the handle. In some aspects, the binder is epoxy. In some aspects, the binder includes structural reinforcement fibers. In some aspects, the binder structural reinforcement fibers include cotton. In some aspects, the binder for the handle sleeve can be devoid of cotton fiber or other fillers.

In some embodiments, a coating or tube or layer or sheet is applied over the handle as the handle sleeve. Optionally, the handle sleeve extends over a portion of the hilt of the head. The handle sleeve can be a composite, such as carbon fiber or Kevlar® with or without another material, such as fiber glass. In some aspects, the handle sleeve is not just carbon fiber, but can be a mix of half the threads are carbon fiber, the other half is a weave. For example, the handle sleeve can be configured like a sock of carbon fiber and/or Kevlar® with or without woven fiber glass.

In some embodiments, the weave material can be colored. For example, the handle sleeve can be a weave of just carbon fiber, which would only be black carbon fiber, and fiber glass, the color being the fiber glass. Alternatively, the handle sleeve can be carbon fiber with or without Kevlar®, or vice versa. The color can be monochromatic or multichromatic. It can be advantageous to include a secondary color in the handle sleeve for visual purposes, such as identifying the location of the tool and make it easier to see. The color can help for identifying and locating the tool (e.g., for safety reasons). Traditional carbon fiber or tubular Kevlar® processing can be used to put the handle sleeve around the handle and then seal it against the head and the handle with binder. The handle sleeve can cover the distal opening of the handle. Using epoxy on the handle sleeve to bind it to the handle can provide a nice smooth finish. In some aspects, it is a grippy finish.

The brake stick can have a transition from the handle to the head to provide an outer protective layer, such as the carbon fiber, Kevlar®, fiberglass, or other protective layer cover. This process can include putting epoxy on the tubular handle, put the handle sleeve on the handle, putting epoxy on the sleeve, and then rubbing the binder off.

In some aspects, the method can include: put epoxy on the head or on the handle first partway down the head, then slide the handle sleeve on the handle, rub the epoxy in, put more epoxy on the outside, and then wipe the handle sleeve down with alcohol so that the handle does not have slicky epoxy on the outside. The bottom of the handle sleeve is tucked up in the proximal opening of the handle. The protocol can include tucking the extra handle sleeve up in the bottom portion (e.g., proximal end) of the tubular handle so the handle sleeve wraps around the corner and tucks up in, or cutting off the excess. Optionally, a dye, such as a yellow or other visible colorant, can be added to the epoxy to enhance the color of the sleeve to be more visually noticeable for safety and visibility purposes.

In some embodiments, the method includes fitting a neck cover over a distal portion of the handle sleeve and a proximal portion of the head. In some aspects, the method includes shrink wrapping the neck cover over portions of the handle sleeve and head. In some aspects, the neck cover is a shrink tube, and is epoxied to the handle by: putting some epoxy on the handle itself, putting the shrink tube over it, and applying heat to shrink it in place.

In some embodiments, the method can include adhering at least one magnet to the handle prior to applying the cover to the handle and magnets. The adhering can be by superglue (cyanoacrylate) or epoxy, or flox, or other adherent. The magnets can include the adherent built up around the sides of the magnet to round out the edges and build up the material around the magnet, but not on the side facing outward from the handle. The outward facing side is only covered with the handle sleeve. In some aspects, at least one magnet is coupled to the handle within the handle sleeve. The magnet(s) can be used to attach the brake stick to metal commonly found in railroad settings. There may be one magnet, but two magnets can be useful to retain the stick in place. In some aspects, the magnets are placed strategically for magnetically attaching the brake stick on a train or a door or ferromagnetic surface. In some aspects, manufacturing attaches two or more magnets to the side of the stick on the flat side or corresponding side orthogonal with the plane of the head. One example includes two magnets spaced apart to be distal or near the head and at least one magnet medial or proximal to the proximal end of the handle.

In some embodiments, another feature of the magnet is that it gives a grip that is a wider region, so the user can get a little better grip from it because the magnet is flat on the outer part of the stick. In some manufacturing, a sleeving is over the magnets and epoxied down.

In some embodiments, the method can include manufacturing at least one of: the head; the cross-support; or the handle. In some aspects, the method can include preparing a plastic or multi-layered composite head and/or cross-support. In some aspects, the method can include cutting the head and/or cross-support from a sheet of plastic or composite material.

In some embodiments, the method can include fitting the end cap onto a proximal end of the handle. In some aspects, the end cap is adhered to the proximal end of the handle opposite of the head. The end cap can be rubber. The end cap can be epoxied onto the handle.

In some embodiments, the endcap has some type of hook or some type of attachment means (e.g., aperture, fastener, etc.) in order to be able to hook or otherwise fasten it onto something.

In some embodiments, there can be drill holes in the head. In the railroad environment, there can be apertures in the stick head that can be used to hang it over hooks. Manufacturing can put holes in it to decrease the weight but still retain the structural integrity.

The brake stick can be significantly strong. The brake stick can have a tensile strength of between 2,474 lbs in one case and 2,629 lbs in another to bends or breaks. However, the tensile strength before catastrophic failure can be greater than or about 200 lbs, greater than or about 300 lbs, greater than or about 400 lbs, greater than or about 500 lbs, greater than or about 600 lbs, greater than or about 700 lbs, greater than or about 800 lbs, greater than or about 1000 lbs, greater than or about 1250 lbs, greater than or about 1500 lbs, greater than or about 1750 lbs, or greater than or about 2000 lbs.

In some embodiments, minimum constant can have a tensile strength of at least or about 800 lbs. The bottom cap will pull off at about 1200 lbs. For example, the lateral crush test is 2,700 lbs.

In some examples, the handle can be at least or about 1 foot, at least or about 2 feet, at least or about 3 feet, at least or about 4 feet, at least or about 5 feet, at least or about 6 feet, or longer if needed.

In some embodiments, a method of using a railroad brake stick is provided. The method can include: providing the railroad brake stick of one of the embodiments; and using the railroad brake stick in a railroad environment. In some aspects, the method can include: using the railroad brake stick for: push or pull brake wheel; push brake release lever; turn angle cocks; adjust draw bars; and/or operate and arm EOTS.

In some embodiments, the manufacturing method of attaching a head to a handle can work for garden tools, docking stick for boats, non-conductive sticks for electrical work, or the like. In some embodiments, the method of manufacture described herein is for manufacturing a tool other than a brake stick. That is, the resulting tool can be a hockey stick, golf putter, yard tool, garden tool, or any other tool that has a head and cross-support in a tubular handle, optionally coated with or without magnets.

In some embodiments, a railroad brake stick can include: a head having a planar shape with a recess and/or protrusion on one or more side surfaces of the planar shape, the planar shape having a head interlocking groove on a hilt region; a cross-support having a planar shape with a support interlocking groove interlocked with the head interlocking groove such that the planar shape of the head crosses with the planar shape of the cross-support to form an interlocking region; and a handle coupled to the head and cross-support such that the interlocking region is within an end of the handle. In some aspects, a handle sleeve is over the handle. In some aspects, the handle sleeve continues over a portion of the head. In some aspects, the head is a durable plastic or composite material and the cross-support is also a durable plastic or composite material, and the handle is a composite material. In some aspects, the head is a durable plastic or first composite material, the cross-support is the durable plastic or first composite material or a different second composite material, the handle is a third composite material and the handle sleeve is a fourth composite material. In some aspects, the durable plastic is high density polyethylene, high density polyurethane, high molecular weight plastic (1-3 million Da), ultra-high molecular weight plastic (3-7.5 million Da), whether filled (e.g., ceramic particles, Kevlar fibers, etc), or other material. In some aspects, the first composite material includes a para-aramid synthetic fiber or a graphene composite material (e.g., graphene in a matrix, such as a binder), or combinations thereof. In some aspects, the second composite material is a layered carbon fiber material, layered para-aramid synthetic fiber, laminate material, composite material, or substituted with a polymer material. In some aspects, the third composite material is carbon fiber. In some aspects, the fourth composite material is woven carbon fiber, woven fiberglass, para-aramid synthetic fiber tube, polyolefin, polyvinyl chloride, fluorohydrocarbon, elastomer, Kevlar (aramid), or combinations thereof. In some aspects, at least two magnets are located on the handle spaced apart from each other.

In some embodiments, the head and handle as well as the handle sleeve of the railroad brake stick are each prepared from non-metallic materials. As a result, the railroad brake stick is devoid of any exposed metallic materials, thereby providing a non-sparking embodiment. While the magnet may be metallic, the magnet is covered by the handle sleeve so that it is not exposed and cannot spark. The non-metallic or non-sparking embodiment with no exposed sparking metal can be used in environments where sparking can be catastrophic. While banging metal railroad brake sticks can cause sparking, the non-sparking embodiment without any exposed metal provided by the composite material allows for use in environments where sparking should be avoided. This allows the composite railroad brake stick to be used in mines, in oil production and refinery sites, in volatile environments, and in product loading areas at production facilities.

In some embodiments, a method of manufacturing a railroad brake stick can include: providing a head having a head interlocking groove on a hilt region; providing a cross-support having a support interlocking groove; interlocking the head and cross-support via the head interlocking groove and the support interlocking groove being coupled in a tongue and groove interlocking; providing a handle having a recess in a distal portion of the handle; inserting the interlocked head and cross-support into the distal portion of the handle; and fixing the handle to the interlocked head and cross-support. In some aspects, the method can include: providing a binder; and binding the handle to the interlocked head and cross-support with the binder. In some embodiments, the binder is epoxy. In some embodiments, the binder includes structural reinforcement fibers. In some aspects, the method can include fitting a handle sleeve as a cover over the handle, and then binding the handle sleeve to the handle. In some embodiments, the binder for the handle sleeve is epoxy. In some embodiments, the binder for the handle sleeve does not include structural reinforcement fibers.

In some embodiments, a method of using a railroad brake stick can include: providing the railroad brake stick of one of the embodiments; and using the railroad brake stick in a railroad environment. In some aspects, the method can include using the railroad brake stick to: push or pull brake wheel; push brake release lever; turn angle cocks; adjust draw bars; and/or operate and arm EOTS.

Figure 6:
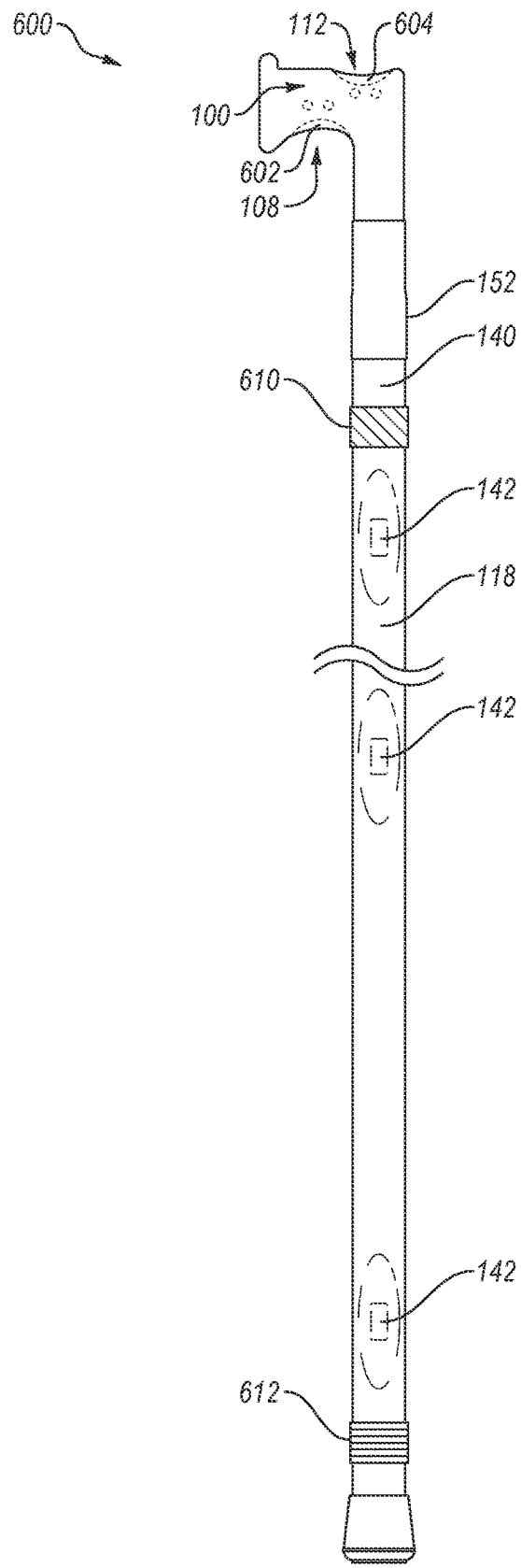
FIG. 6 shows a side view of the railroad brake stick having the brace implant in the head.

FIG. 6 illustrates another embodiment of a brake stick 600 that includes the features as described herein with modifications. The head 100 includes a brace implant 602 located in the proximal concave region 108. Optionally, the head 100 include a second brace implant 604 located in the distal concave region 112. Accordingly, any embodiment can include at least one brace implant within any proximal or distal concave region.

The side connecting between the planar surfaces can include the brace implant 602 so that the use of the surface causes the brace implant 602 to receive the work. That is, the brace implant 602 is positioned to receive contact with a railroad element surface that is being worked with the brake stick 600. The pulling motion of the brake stick 600 can cause the proximal concave region 108 to work against a member of the railroad environment. For example, using the proximal concave region 108 to pull against a brake wheel causes wear in the proximal concave region 108. Now, the pulling force with the brake stick 600 can be against the brace implant 602. Accordingly, the brace implant 602 can be prepared from an extremely durable material, which is more durable than the head material. Similarly, the second brace implant 604 can be used for pushing work motions with the brake stick 600.

Accordingly, the head material can be a durable and light material to provide the structure and support for the railroad brake stick to allow easier use by the user. The brace implant is provided as a small member to act as the working surface to inhibit wear. The brace implant can be an extremely durable material, such as bronze or an alloy thereof, that can be wear resistant in the railroad stick use environment. This allow for enhanced pulling operations without wearing the proximal concave region that is highly used during normal operations. Instead of the entire head being a highly durable material, the lightweight head can include the small brace implant to enhance usability of the railroad brake stick. The distal concave region can be similarly reinforced with a brace implant.

FIG. 6 also shows a reflective member 610 that includes a surface that reflects light. Additionally, FIG. 6 shows a phosphorescent member 612 that can glow in the dark. These members can enhance the ability to see the railroad brake stick, whether during the day (reflective) or night (glowing). These members can be patches, tapes, rings, wraps, or other attachment that are coupled to the handle sleeve of the railroad brake stick.

Figure 7:
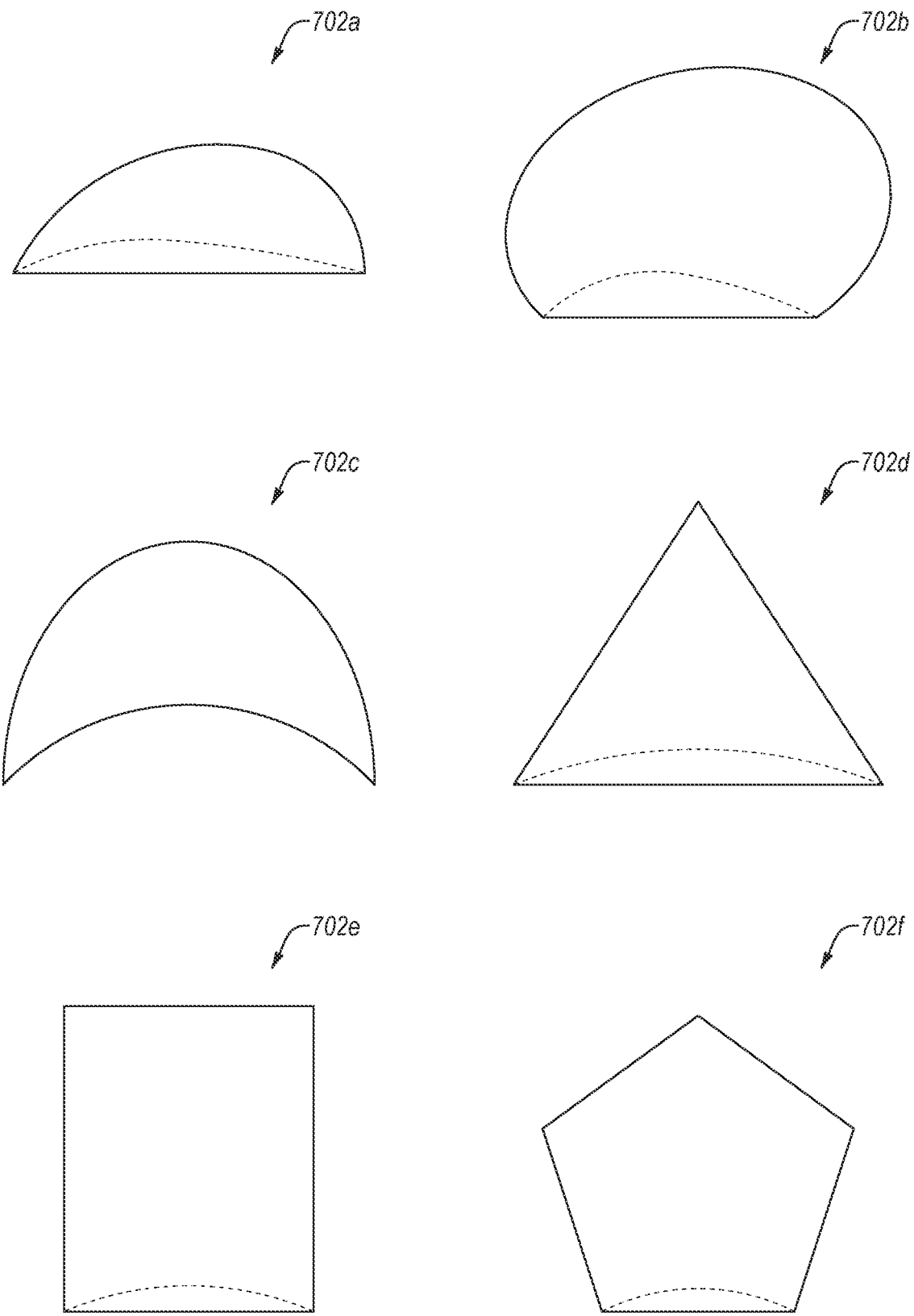
FIG. 7 shows side views of planar brace implant shapes.

FIG. 7 illustrates different shapes of a planar brace implant 702a-702f that can be mounted to the head of the railroad brake stick. The dashed line represents a concaved work surface so that the proximal surface is concave instead of flat. As such, the working surface of the railroad brake stick that contacts the railroad elements is the surface of the planar brace implant 702a-702f that is concave or flat.

Figure 8A:
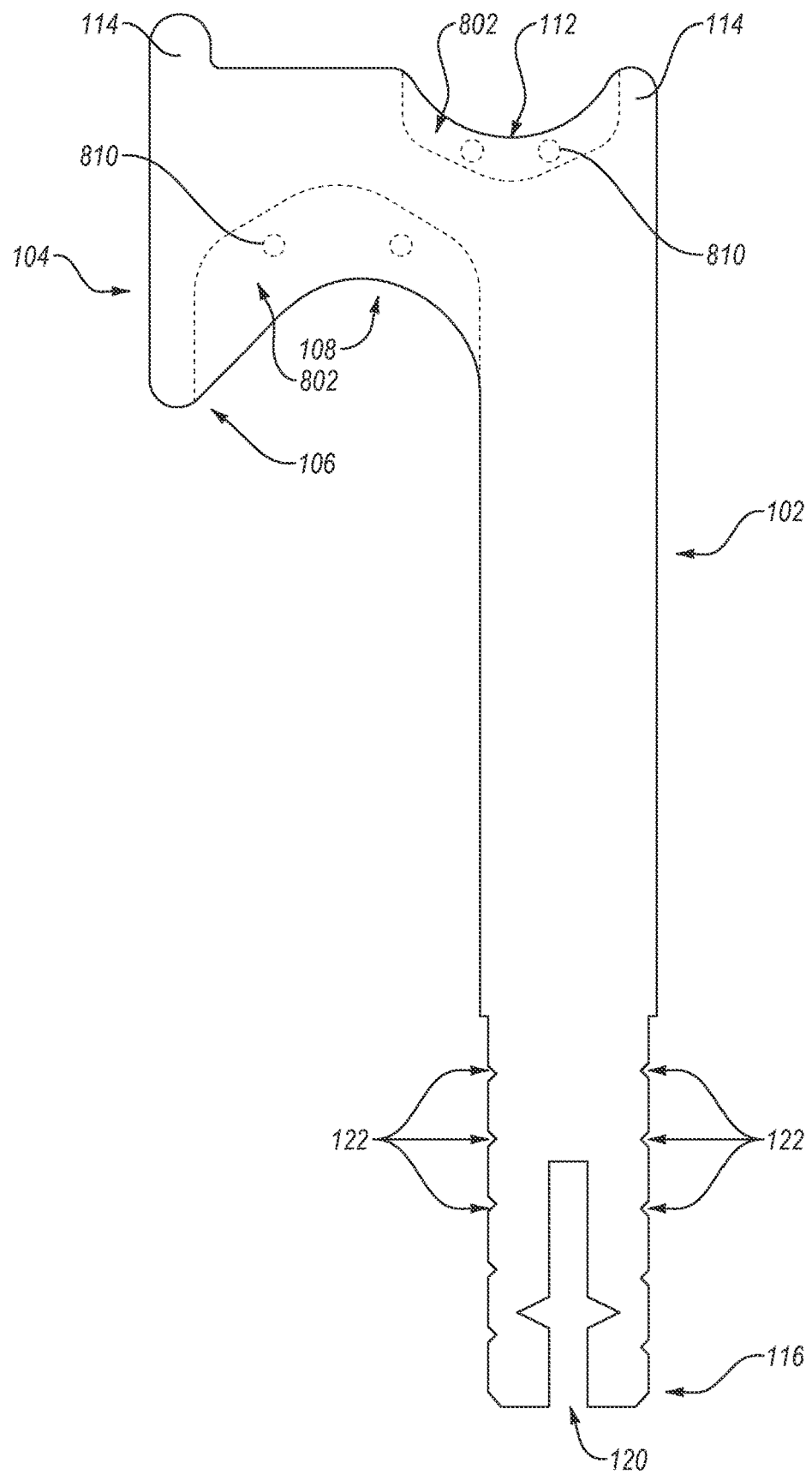
FIG. 8A shows a side view of the planar railroad brake stick head showing implant recesses formed therein, wherein the implant recesses are adapted to receive the brace implant.
Figure 8B:
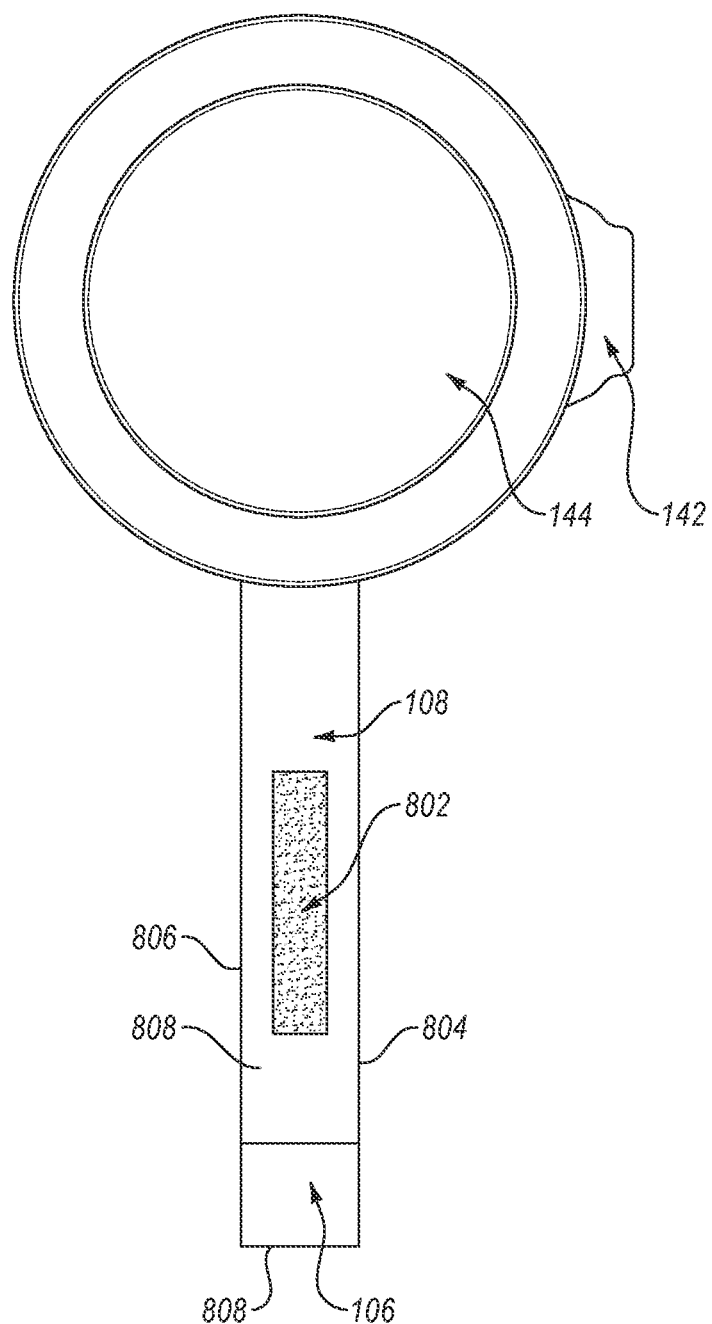
FIG. 8B shows a bottom view that indicates placement of the implant recess in the proximal concave region of the railroad brake stick head.

FIGS. 8A-8B illustrate the implant recess 802 that receives the brace implant (e.g., 602). As such, the implant recess 802 can be shaped and dimensioned to receive any of the planar brace implants 702a-702f, or other shape. The implant recess 802 can be formed into the side surface 808 between the two planar surfaces 804, 806. FIG. 8A shows a side view where the cross-sectional profile of the implant recess 802 is shown. FIG. 8B includes a bottom view where the location of the implant recess 802 in the side surface 808 between the planar surfaces 804, 806 is shown. In some aspects, the head (e.g., 100) includes at least one implant recess 802 formed into the at least one concave sidewall region (e.g., 108), and the at least one brace implant 602 is in the at least one implant recess 802. In some aspects, each brace implant 602 is coupled with the head 100. In some aspects, the coupling of each brace implant 602 with the head 100 is by friction fit, adhesive, fastener, or combination thereof. In some aspects, the fastener includes at least one rivet 810 or other member (e.g., roll pin) that rivets or otherwise couples to the brace implant 602 through the planar surfaces of the head 100. Thus, the fastener (e.g., rivet 810) includes at least one member that fixes to the brace implant through the planar surfaces of the head body.

The implant recess can be formed by any method. An example includes forming the head, and then forming the implant recess within the body of the head. For example, a carving device can be used to carve the material from the proximal concave region to form the implant recess between the two planar surfaces.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

As used, herein the phrase "second material having a second hardness that is harder than the first hardness" indicates the second material has a harness property that is harder than the first material. For example, the first material may be a plastic and the second material may be a metal. The hardness may be a calculated hardness or a durability to wear. As such, wear resistance can be a measure of hardness for the first material relative to the second material. The hardness can be resistance to indentation or other deformation, such a load or scratching. Mohs scale can be used to determine the relative hardness of the first material to the second material.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

The invention claimed is:
1. A railroad brake stick head comprising:
   a. a head body formed of a lightweight durable material of a first hardness with a tool region and a hilt, wherein the tool region has one or more working surfaces configured for working one or more railroad elements of a railroad environment, wherein at least one of the one or more working surfaces includes a concave sidewall region having a recess formed therein, wherein the hilt is configured to be coupled with a handle;
   b. at least one brace implant partially embedded in the recess formed into the at least one concave sidewall region, wherein each brace implant is formed of a second material having a second hardness that is harder than the first hardness.
2. The railroad brake stick head of claim 1, comprising:
   a. the head body having two opposing planar surfaces spaced apart by at least one sidewall that includes the at least one concave sidewall region.
3. The railroad brake stick head of claim 1, wherein the head body includes one implant recess formed into one concave sidewall region, and one brace implant is in the one implant recess.
4. The railroad brake stick head of claim 1, wherein each brace implant is coupled with the head body.
5. The railroad brake stick head of claim 4, wherein the coupling of each brace implant with the head body is by friction fit, adhesive, fastener, or combination thereof.
6. The railroad brake stick head of claim 5, wherein the fastener includes at least one member that fixes the brace implant to the head body.
7. The railroad brake stick head of claim 1, wherein the head body is formed of a plastic material or a composite material.
8. The railroad brake stick head of claim 7, wherein the plastic material is selected from high density polyethylene, ultra-high molecular weight polyethelene, high density polyurethane, polyoxymethylene (Acetal), polyimide Vespel), high impact polystyrene, polyamide-imide, (PAI), polybutylene terephthalate (PTB), polyetheretheketone (PEEK), polyethylene terephthalate (PET), or combinations thereof, wherein the plastic material optionally includes a filler of particles or fibers.
9. The railroad brake stick head of claim 1, wherein the brace implant is formed of a metal material.
10. The railroad brake stick head of claim 9, wherein the metal material is selected from brass, stainless steel, carbon and manganese steels, bronze, manganese bronze, or combinations thereof.
11. The railroad brake stick head of claim 1, wherein the brace implant is a non-sparking material.
12. The railroad brake stick head of claim 11, wherein the non-sparking material is cubic boron nitride, carbon nitride, carbide, cermet, brass, bronze, copper-nickel alloy, copper-aluminum bronze alloy, copper-beryllium bronze alloys, or combinations thereof.
13. The railroad brake stick head of claim 1, wherein the hilt includes a hilt end portion, wherein the hilt end portion includes a slot extending between two opposing planar surfaces from a hilt end toward the head portion.
14. The railroad brake stick head of claim 13, wherein the hilt end portion includes a plurality of notches formed into opposing hilt sidewalls, wherein each notch extends between the two opposing planar surfaces.
15. The railroad brake stick head of claim 13, wherein the slot includes at least one notch formed into at least one slot sidewall, wherein each notch extends between the two opposing planar surfaces.
16. A railroad brake stick comprising:
   a. the railroad brake stick head of claim 1; and
   b. a handle coupled with the railroad brake stick head.
17. The railroad brake stick of claim 16, comprising:
   a. the head body having a planar shape with having a head interlocking groove on a hilt region;
   b. a cross-support having a planar shape with a support interlocking groove interlocked with the head interlocking groove such that the planar shape of the head crosses with the planar shape of the cross-support to form an interlocking region; and
   c. the handle is coupled to the head and cross-support such that the interlocking region is within an end of the handle.
18. The railroad brake stick of claim 16, further comprising at least one of a phosphorescent member or reflective member attached to the handle.
19. A method of operating a railroad brake stick, comprising:
   a. providing the railroad brake stick of claim 16; and
   b. operating a railroad element with the head of the railroad brake stick such that the at least one brace implant contacts the railroad element.
20. A method of making the railroad brake stick head of claim 1, comprising:
   a. forming a head body having two opposing planar surfaces spaced apart by at least one sidewall that includes at least one concave sidewall region, wherein the head body is formed of a first material having a first hardness; and
   b. forming at least one brace implant; and
   c. embedding the at least one brace implant in at least one concave sidewall region, wherein each brace implant is formed of a second material having a second hardness that is harder than the first hardness.
21. A method of making a railroad brake stick, comprising:
   a. performing the method of claim 20 to obtain the railroad brake stick head; and
   b. coupling the railroad brake stick head with a handle.

* * * * *